United States Patent [19] … [11] Patent Number: 4,542,663
Kudelski et al. … [45] Date of Patent: Sep. 24, 1985

[54] REEL HUB ASSEMBLY FOR TAPE TRANSPORT

[75] Inventors: Stefan Kudelski, Le Mont-sur-Laussane; Ernest Rosselet, Assens; Eberhard Pertz, Epalinges, all of Switzerland

[73] Assignees: Ampex Corporation, Redwood City, Calif.; Kudelski S.A., Lausanne, Switzerland

[21] Appl. No.: 533,094

[22] Filed: Sep. 15, 1983

[30] Foreign Application Priority Data

Sep. 17, 1982 [GB] United Kingdom ............... 8226571

[51] Int. Cl.[4] ........................... F16H 1/28; F16H 3/44
[52] U.S. Cl. ...................................... 74/801; 74/789; 74/797; 242/200; 242/204
[58] Field of Search ............... 242/200, 201, 202, 203, 242/204; 74/789, 801, 797, 409, 411.5

[56] References Cited

U.S. PATENT DOCUMENTS

| 1,348,539 | 8/1920 | Breitenbach | 74/801 X |
| 2,716,005 | 8/1955 | Askren et al. | 74/789 X |
| 3,153,515 | 10/1964 | Scully et al. | 242/204 |
| 3,498,571 | 3/1970 | Dilling et al. | 242/203 |
| 3,690,198 | 9/1972 | Huber | 74/785 |
| 4,303,210 | 12/1981 | Fujita et al. | 242/200 |
| 4,406,340 | 9/1983 | Gennaux | 74/801 X |

FOREIGN PATENT DOCUMENTS

| 1082091 | 5/1960 | Fed. Rep. of Germany | 242/201 |
| 2816699 | 11/1978 | Fed. Rep. of Germany | 242/201 |
| 52-41766 | 3/1977 | Japan | 74/409 |

Primary Examiner—George H. Krizmanich
Assistant Examiner—Wright D.
Attorney, Agent, or Firm—George B. Almeida; Harry G. Thibault; Joel D. Talcott

[57] ABSTRACT

A self-contained reel hub assembly for a tape transport. The hub assembly comprises a housing including a base and a side wall which upstands from and extends around the periphery of the base. Within the housing defined by the side wall is the rotor and the stator winding of a motor. The rotor drives a sun wheel which engages a plurality of planet wheels each of which protrudes laterally from the side wall of the housing. A rotatable hub is mounted on a central post extending upwardly from a frame member forming a top cover for the housing. The hub member includes a peripheral part which extends around the side wall of the housing and carries a ring of inwardly directed gear teeth engaged by the planets. The planets are linked by a carrier which permits limited movement of the planets relative to the carrier.

5 Claims, 3 Drawing Figures

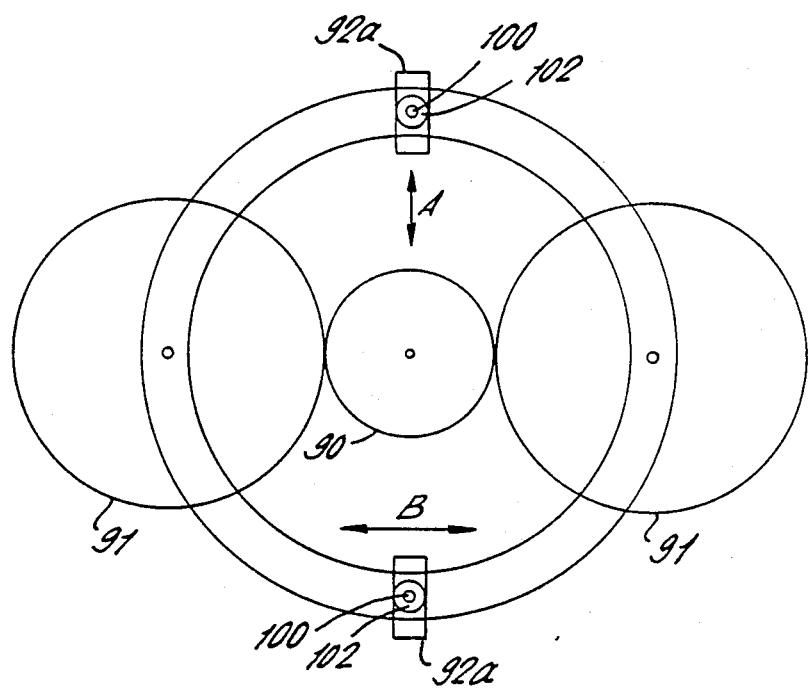

REEL HUB ASSEMBLY FOR TAPE TRANSPORT

BACKGROUND TO THE INVENTION

This invention relates to a motor driven hubs for the support of supply or take-up reels in magnetic tape recording or playback machines, particularly though not exclusively a magnetic tape recorder adapted for the recording and playback of video signals.

In many forms of tape transport it is necessary, in order to relieve any unnecessary load on a tape driving capstan and also to maintain a suitable tension in the magnetic tape, to drive a take-up or supply reel of tape. For this purpose it is well-known to provide a hub which can receive a reel of tape and which is coupled to a motor which is in most forms of machine servomechanically controlled in response to variations in tape tension of tape as measured by monitoring a loop of tape formed by appropriate guides at a position along the tape's path of travel near the supply of take-up reel. The present invention is particularly directed to a motor driven hub which is, apart from the necessary electrical connections, self contained, in that it includes the associated drive motor. Such a hub has some advantages in respect of manufacture and servicing. Moreover, in some forms of recorder it is desirable to shift the hub in order to accommodate different size reels. For example, in a battery operated portable video recorder, the recorder may be arranged so that it can operate, with comparatively small size reels, with a lid closed but is versatile enough to take large size reels which may require shifting of the supply and take-up reel hubs and the operation of the recorder with the lid removed. The shift of the supply or take-up reel hubs could be effected by simple pivoting but if ordinary forms of drive and drive coupling were used for the hub, a complex coupling between the motor and the hub would be required.

A further aspect of the invention arises from the considerations of efficiency and light weight, particularly for battery operated portable video tape recorders. In order to a achieve a construction which fulfils these criteria, it is preferable, although not essential, to provide, within a housing on which the hub rotates and which forms a common unit with the hug, the relatively rotating parts, that is to say the rotor and stator, of a brushless DC machine. Such a machine is inherently efficient and can be made in a lightweight construction but since it is preferable to drive such a motor at high speed appropriate gearing is necessary between the motor and the hub. A further aspect of the present invention is therefore the design and manner of operation of a hub which includes its own motor and which also includes appropriate gearing between the motor and the rotating part of the hub.

Another aspect of the invention lies in the features of construction which enable the hub which rotates and on which the reel is to be mounted to be removed easily from the rest of the hub unit without disturbing the remainder of the unit.

In a preferred form of the invention, a motor driven hub for holding and rotating a tape reel comprises a housing including at least a base and a side wall extending around the base, a rotary hub which is adapted for holding a reel of tape, the hub including a peripheral part which extends around the side wall and includes an inwardly directed ring of gear teeth, an electric motor, which may be a brushless DC motor, which is contained within the housing, a gear wheel which protrudes outwardly with respect to said side wall to engage said ring of gear teeth and means within the housing for coupling the motor to the gear wheel. In a particular form of the invention, the coupling means may comprise a sun wheel which is connected to be driven by the motor and the aforesaid gear wheel may constitute one of a pair of planet wheels evenly spaced around the sun wheel, each such planet wheel being in driving engagement with the sun wheel and protruding laterally of the side wall to engage the said ring. One important feature of such a coupling is the linking of the planet wheels so as to permit conjoint limited movement of the planets relative to the sun in a direction parallel to and transverse the line forming the centres of the planets. The transverse movement enables the sun to drive both planets evenly and the parallel movement, which is preferably resiliently resisted, reduces noise and promotes a smoother transmission of power.

The aforementioned advantages and various other objects and advantages of the invention will be apparent from a consideration of the following description with reference to the accompanying drawings.

BRIEF DESCRIPTION OF THE DRAWINGS

FIG. 3 is a diagram schematically illustrating a gear coupling in the embodiment shown in FIG. 2.

DETAILED DESCRIPTION OF THE PREFERRED EMBODIMENT

Figure 1:
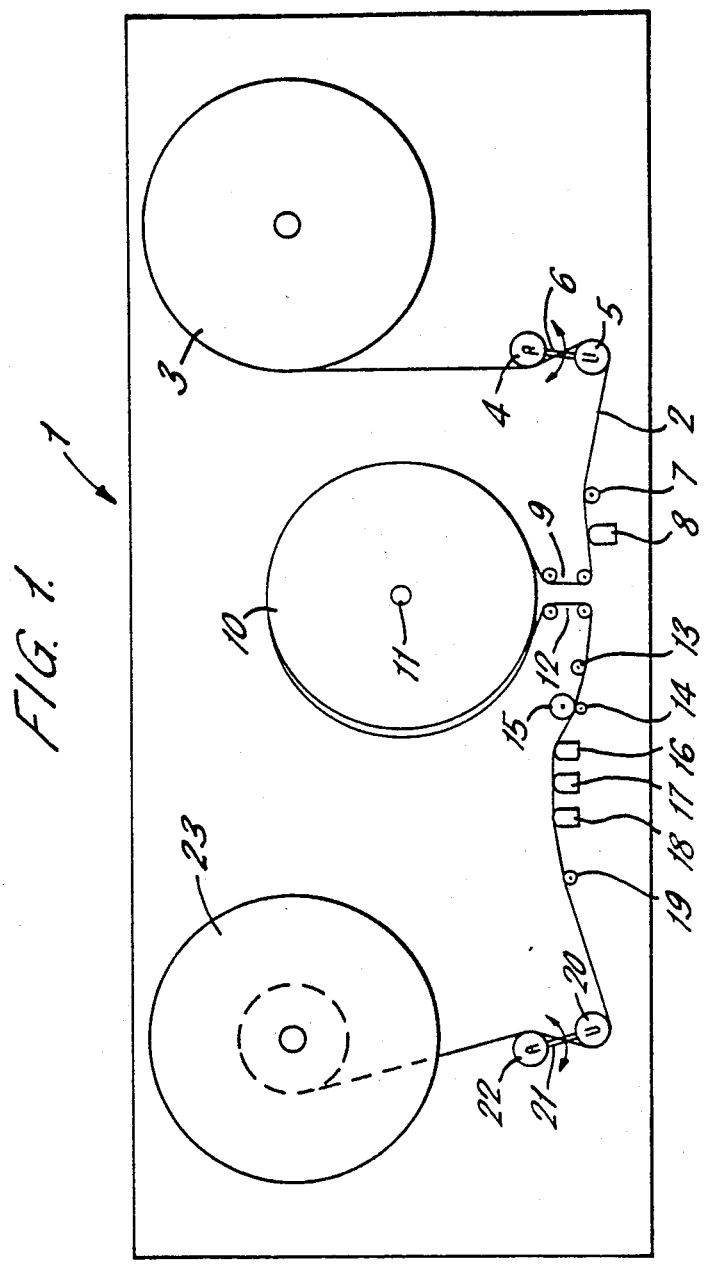
FIG. 1 is an explanatory schematic diagram of the principal parts of a video tape recorder.

FIG. 1 illustrates in simplified form the principal parts of a video recorder. As is shown in FIG. 1, the recorder 1 is intended for recording signals or playing back signals from a magnetic tape 2 which is supplied by a supply reel driven by its own motor. A suitable construction for a hub supporting the reel 3 will be set forth with reference to FIG. 2. From the supply reel the path of the tape 2 extends around a rotary guide 4 and thence to a guide 5 which is carried at one end of an arm 6 mounted for rotation coaxially with the guide 4. The purpose of the pivoted arm is to provide sensing of the tape tension in a loop formed around the guide 5. If the tension in the tape in this loop increases, the arm 6 will rotate. The rotation of the arm can be sensed by any convenient known means and used in known manner to control the motor which drives the reel 3 in order to maintain a substantially constant tension in the length of tape in the loop.

From the guide 5 the path of the tape extends past a guide 7, a video erase head 8, and around a pair of guides 9 controlling the entrance of the tape to a helical path extending around a drum 10 of which the axis 11 is slightly tilted relative to the general plane of the path of the tape. Within the drum is a motor around the periphery of the drum a scanning head for the scanning of the tape in oblique tracks, in a manner generally known per se. At the end of the helical path of the tape around the drum 10 the tapes passes around a pair of guides 12 and extends past a guide 13 to capstan 14 which is provided with a pinch roller 15 for the maintenance of the tape in close promixity to the capstan. The tape path extends from the capstan past erase, audio and control track heads 16 to 18 and then around a further guide 19, a guide 20 mounted at one end of a pivoted arm 21 rotatable about a pivot, a further guide 32 which is coaxial with the pivot for the arm 21, and finally a take-up reel 23. The guide 20 acts in a manner similar to the guide 5, a pivoting movement of the arm 21 providing a measure of the tension in the loop of tape around the guide 20 and providing a control for the motor (not shown) which drives the take-up reel 23.

Figure 2:
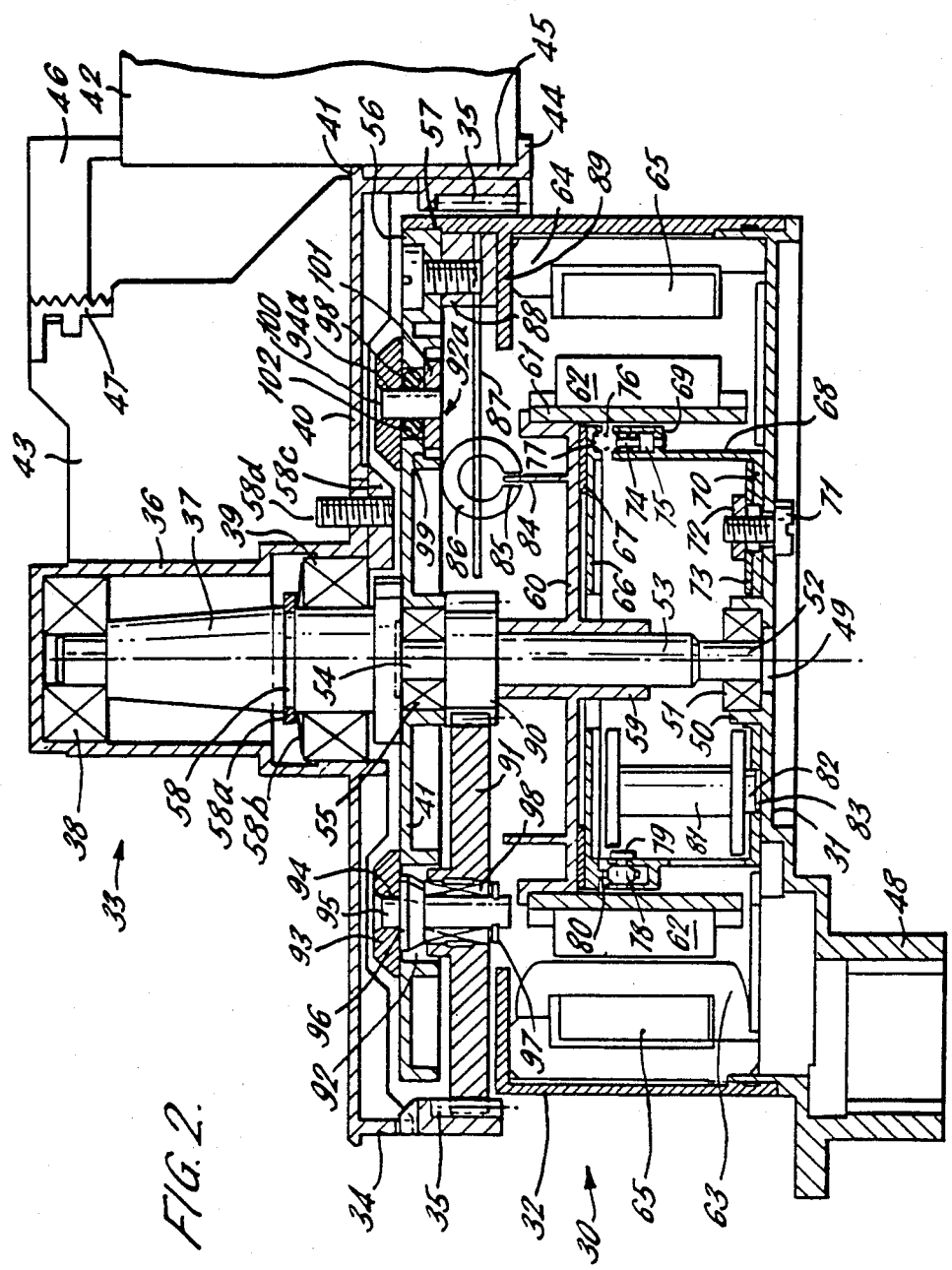
FIG. 2 is a sectional view of one embodiment of motor driven hub.

FIG. 2 illustrates in sectional form a preferred construction for a hub which is to support a supply reel or a take-up reel. It is important to note that the two halves of FIG. 2 represent sections of right angles to each other.

The hub unit comprises a housing 30 composed primarily of a circular base 31 and an upstanding peripheral side wall 32, and a rotary hub 33 which includes an axially directed peripheral portion or annulus 34 which extends around the side wall 32 of the housing and carries an internally toothed ring 35 of which the gear teeth face inwardly towards the side wall. The hub 33 is intended to be removable from the rest of the unit and for this purpose the central part of the hub has the shape of an inverted cup 36 which fits over a post 37 that carries an upper bearing 38 and a lower bearing 39 which mount the cup portion 36 for rotation about the axis of the cup. The hub 33 has a radial flange 40 extending outwardly from the bottom of the cup 36. The flange 40 terminates in a rim 41, the annular portion 34 forming an annular rebate with the rim 41.

The hub is adapted to accommodate a reel 42 but the manner in which it does so is not of importance. In this embodiment of the invention, because the reels 3 and 23 are at different heights, the hub can carry reels at two different heights. For the upper height the hub carries an assembly including radial ribs 43 which extend from the side wall of the cup 36 to near the periphery of the flange 40. These ribs are provided for strengthening and stiffening the hub 33. The spool 42 is shown as adjacent the annulus 34 and is supported between a flange 44 which forms part of an annular 45 secured to the annulus 34 and a screw fixing 46 which engages a screw-threaded member 47 in engagement with the ribs 43.

For the lower height of a reel, the hub is adapted differently, in a manner not relevent to the invention, the bottom side of the reel being then approximately level with the upper surface of the base 31.

The base 31 includes a downwardly extending post 48 which is eccentric relative to the rotary axis that extends centrally of the base and axially of the post 37 and the hub 33. The purpose of the downwardly extending post 48 is to provide a pivoted mount for the unit so that the unit can be pivoted from a position suitable for accommodating one size of reel to another position suitable for accommodating a different size of reel.

The base 31 has a central aperture 49 which is surrounded by a short upstanding annular flange 50 accommodating a bearing 51 in which the lower, reduced diameter, end 52 of a shaft 53 is supported. The upper end 54 of the shaft 53 is received in a bearing 55 secured in a cover plate 56, which carries the post 37 and extends so as to form a top cover for the housing 30 at the side wall 32, the periphery of the plate 56 being accommodated within a rebate 57 in the upper inner margin of the side wall 32.

The post 37 is shouldered at the top of carry the bearing 38 and has a groove 58 for a split ring 58a retaining a frusto-conical washer 58b to retain the bearing 39 against a lug 58c which is externally adjustable by means of a screw 58d.

The shaft 53 carries a sleeve 59 from which extends laternally a disc part or rotor 60 which carries at its periphery a cylindrical member 61 coaxial with and surrounding the rotor. The member 61 provides a mount for a plurality of permanent magnets 62 which produce the field system of the motor accommodated within the housing. The stator for this motor comprises windings shown schematically at 63 and carried in a plurality of narrow upstanding ribs 64 spaced apart around the periphery of the rotor, just inside the side wall 32 of the housing. The ribs 64 preferably support a magnetic return 65.

The magnets 62 on the rotor, together with the windings 63 are the principal parts of a brushless DC motor. In such a motor, unlike an ordinary DC motor in which the field magnets are fixed and the energising windings rotate on a armature which has a commutator ring for switching the polarity of currents applied to the armature windings, the field magnets rotate and the windings are stationary. Brushless commutator motors are well-known in principle. It is also known that commutation for a brushless DC motor must be performed by an electrical switching circuit which however forms no part of the present invention and will not therefore be described.

The magnets 62 area axially offset from the coils 63 so that the prior rotor is, while driven, urged upwardly.

Below the rotor is a brake. This is constituted by a disc 66 which carries pads 67 positioned to engage the underside of the rotor disc 60. The brake disc 66 is disposed over and in general registered with a dish member including a cylindrical side wall 68 and a base plate 70. The plate 70 is attached to the base 31 at appropriate angularly spaced intervals by means of bolts such as the bolts 71 extending through the base 31 to a nut 72 which engages the upper surface of the base plate 70 by means of a washer 73.

Around the outside of the wall 68 is a channel member 69 which thus provides an annular channel extending around the wall 68. Accommodated within this channel member 69, at spaced intervals, are spigots such as the spigot 74 which carries a collar 75 for the support of the lower end of a compression spring 76 which extends upwardly into a recess 77 formed at the periphery of the brake disc 66, so as to be in approximate register with the channel formed by the channel member 69. The springs such as the spring 76 provides a means for urging the brake disc into engagement, via the pads 67, with the rotor disc 60.

Also at intervals spaced apart around the periphery of the wall 68 are bushings 78 supported in the channel member 69 by means of screws 79. The bushings each have a bore which receives a respective downwardly extending spigot 80 carried on the brake disc 66. The spigots and bushes thereby provide for fixing of the brake disc 66 against rotation.

Below the brake disc, which is ferromagnetic, is a spool 81, of which the lower end 82 is accommodated in an aperture 83 formed in the base plate 70. The spool 81 carries a solenoid winding (not shown for convenience) energisation of which will attract the brake disc downwardly so as to permit the rotor disc 60 to rotate.

As is well-known, the timing of the switching of a commutator circuit in a brushless commutator motor is preferably attained by sensing the rotation of the rotor and deriving pulse signals as the rotor passes through predetermined phase position. For this purpose the rotor disc 60 carries upstanding, short arcuate portions 84, which are coaxial with the rotor. The path of the arcuate portions 84 extends through a gap 85 in a core 86 on which is carried a sensing winding (not shown). The core 86 is carried on an arm 87 which is mounted by means of a mounting block 88 carried on an inwardly extending flange 89 from the side wall 32 of the housing 30. The number of sensing coils depends on the number of phases of the stator winding and the number of arcuate portions 84 depends upon the number of effective poles of the motor; there may be two portions 84 and two sensing coils, so that four pulses per revolution of the rotor are obtained.

In order to provide a geared coupling between the rotor of the motor and the hub and yet provide a coupling which enables the hub to be removed without disturbance to the remainder of the unit, the shaft 53 carries a sun wheel 90 which is in geared connection with at least one planet wheel. Preferably there is a symmetrical pair of planet wheels 91. Each planet wheel is mounted so to a protrude slightly from the side wall 32 of the housing and thereby to engage the teeth of the internally toothed ring 35.

For mounting the planets, the plate 56 has angularly spaced apertures 92 over which is mounted a carrier in the form of a ring 93 which for each aperture 92 has a countersunk bore 94 for a shaft 95. This shaft carries or is formed integrally with a collar 96 between which and a clip 97 is supported a bearing 98 for the planet 91.

There are four apertures 92 spaced at 90° intervals. Two opposite apertures provide a mounting of the ring 93 to the rim or frame 41, the manner of mounting being illustrated for the right hand aperture 92a in FIG. 2. The aperture 92a has an upper part 98 of smaller diameter and a lower part 99 of larger diameter forming a recess in the plate 56. Through the aperture 92a extends a short spigot 100 which is supported by the countersunk bore 94a and carries a collar 101 which fits loosely in the recess constituted by the lower part 99 of the aperture 92a. The collar traps within the upper part 98 of the aperture 92a a ring 102 of rubber or other resilient material.

The arrangement of the sun wheel 90, the planets 91, the annulus 34, the ring 93, the apertures 92a, the spigot 100 and the rings 102 is shown in FIG. 3. The apertures 92a are shown elongate in a direction transverse the imaginary line between the axes of the planets 91 for the purpose of explanation. Although the apertures 92a could be thus formed, in the actual embodiment illustrated in FIG. 2 the rings 102 are shaped so that the spigots have some free movement in the direction which is radial with respect to the sun wheel and have some, resiliently opposed movement in the direction which is circumferential with respect to the sun wheel (these directions being denoted by the arrows A and B respectively). Both movements are limited by the collars 101 and the recesses 99.

The free movement in the direction of the arrow A ensures that if there is tooth-to-tooth engagement between the sun wheel and only one of the planets 91 the consequent slight rotation of the system of planets and link re-establishes tooth-to-tooth engagement of sun and planet on each side of the sun wheel. Thus this movement ensures balance in the drive coupling.

The movement in the direction of the arrow B smooths out irregularities in the gears, reduces noise and assists in maintaining balance in the drive to the annulus.

Although the rings 102 are preferably as described, they may be simply circular so that both the movements mentioned are resiliently resisted. Such a form for the rings may be appropriate if there are more than two evenly spaced planet wheels and more than two apertures 92a and associated groups of components.

We claim:

1. A motor driven hub assembly for holding and rotating a tape reel, comprising:
    a housing;
    a rotary hub which is adapted for holding a reel of tape, the hub including a driving annulus;
    a motor;
    a sun wheel connected to be driven by the motor;
    a plurality of planet wheels evenly spaced around the sun wheel, each such planet wheel being positioned for driving engagement with the sun wheel and said annulus;
    a carrier for said planet wheels; and
    a support for said carrier, said support incuding at least two restraining devices, permitting restricted movement of the carrier radially and circumferentially of said sun wheel, each restraining device comprising means defining an aperture, a spigot extending into said aperture and a resilient ring encircling said spigot and disposed within said aperture.

2. An assembly according to claim 1 in which there are two planet wheels at 180° intervals around the sun wheel and two of said restraining devices interspersed between said planet wheels.

3. An assembly as set forth in claim 1 wherein the rotary hub includes a disc portion and in which the housing includes an annular member adapted for braking engagement with the disc member, means for urging the brake member towards the disc member, and means for mounting an electrical coil for attraction of the brake member away from the disc member.

4. A self-contained motor driven hub assembly for holding and rotating a tape reel, comprising:
    a housing including at least a base and a side wall extending around the base;
    a rotary hub which is adapted for holding a reel of tape, the hub including a peripheral part which extends around the side wall and includes a ring of inwardly directed gear teeth;
    means for mounting the hub for rotation with respect to the housing;
    an electric motor which is contained within the housing;
    a sun wheel which is connected to be driven by the motor;
    a plurality of planet wheels evenly spaced around the sun wheel, each such planet wheel being in driving engagement with the sun wheel and protruding laterally of the said wall to engage the said ring;
    a carrier for linking the planets;
    means for mounting the planets on the carrier such as to permit restricted movement of the carrier radially with respect to the sun wheel;
    a support for said carrier, said support including at least two restraining devices, permitting restricted movement of the carrier radially and circumferentially of said sun wheel, each restraining device comprising means defining an aperture, a spigot extending into said aperture and a resilient ring encircling said spigot and disposed within said aperture.

5. An assembly according to claim 4, wherein the means for mounting the planets on the carrier permits restricted and resiliently resisted movement of the carrier in a direction circumferential with respect to the sun wheel.

* * * * *

UNITED STATES PATENT AND TRADEMARK OFFICE
CERTIFICATE OF CORRECTION

PATENT NO. : 4,542,663
DATED : September 24, 1985
INVENTOR(S) : Stefan Kudelski, Ernest Rosselet, Eberhard Pertz It is certified that error appears in the above-identified patent and that said Letters Patent is hereby corrected as shown below:

Column 3, line 2, "32" should read --22--.

Column 3, line 66, "of" should read --to--.

Column 4, line 29, "prior" (omitted) should read --the prior rotor--.

Column 4, line 50, "via" should read --*via*--.

Column 4, line 65, "of the switching" should read --for the switching--.

Column 5, line 1, "position" should read --positions--.

Signed and Sealed this

Twenty-seventh Day of May 1986

[SEAL]

Attest:

DONALD J. QUIGG

Attesting Officer

Commissioner of Patents and Trademarks